Aug. 12, 1958    C. G. DE BLASIO    2,847,636
DIRECT CURRENT POWER SOURCE
Filed Aug. 20, 1956    3 Sheets-Sheet 1

INVENTOR.
CONRAD G. DeBLASIO
BY
Harold R. Gregor
Atty.

INVENTOR.
CONRAD G. DeBLASIO

Aug. 12, 1958   C. G. DE BLASIO   2,847,636
DIRECT CURRENT POWER SOURCE
Filed Aug. 20, 1956   3 Sheets-Sheet 3

INVENTOR.
CONRAD G. DeBLASIO

United States Patent Office 2,847,636
Patented Aug. 12, 1958

2,847,636

DIRECT CURRENT POWER SOURCE

Conrad G. De Blasio, Middletown, N. J.

Application August 20, 1956, Serial No. 605,133

11 Claims. (Cl. 323—22)

My invention relates to improvements in regulating methods and means for a direct current power source, and more particularly to a regulating method and means wherein vacuum tube voltage-regulator circuits are used to maintain a constant D. C. output voltage across the load by regulating action accomplished, in part, by employment of one or more so-called degenerative or feedback circuits.

Voltage regulator circuits coming within the general class to which my improved system or circuit relates are disclosed in Letters Patent Nos. 2,609,527; 2,607,912; 2,602,915; 2,569,500; and 2,556,129. Reference might also be made to the respective disclosures in Letters Patent Nos. 2,462,935; 2,567,880; 2,594,572; 2,780,734; and 2,625,675.

One form of regulated direct current power source used heretofore comprises an input comparator system or circuit, a reference system or circuit, an amplifier, and one or more series tubes connected to function as a control unit. In many applications or uses of such power sources it is required that the output potential be adjusted down to zero. However, performance within the output-voltage range from zero to about ten volts in these power sources or systems of the prior art, is very poor with regard to stability and regulation.

An object of the present invention resides in the provision of a direct current power source or system of the character referred to, but which embodies regulating means so characterized and so disposed in the system as to give an entirely new order of performance in the field of wide-range, regulated, D. C. voltage or current, and among other specific things and novel features of performance, to give steady, ripple-free voltages at a fraction of one volt.

Another object resides in the provision of a direct current power source or system of excellent, long-time stability, in which there are no moving parts, and which is exceptionally compact for the power rating.

Another object resides in the provision of an improved form of stabilized D. C. power source or supply of the character referred to which is capable of being remotely programmed and which is far superior to prior and comparable power sources in the way of giving considerably better performance than and having important, novel features of control over the latter.

Other objects and advantages will hereinafter appear.

Figure 1:
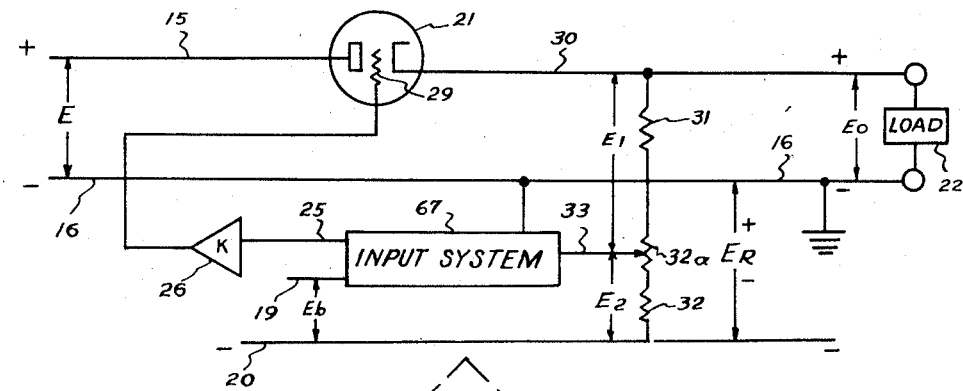
Figure 2A:
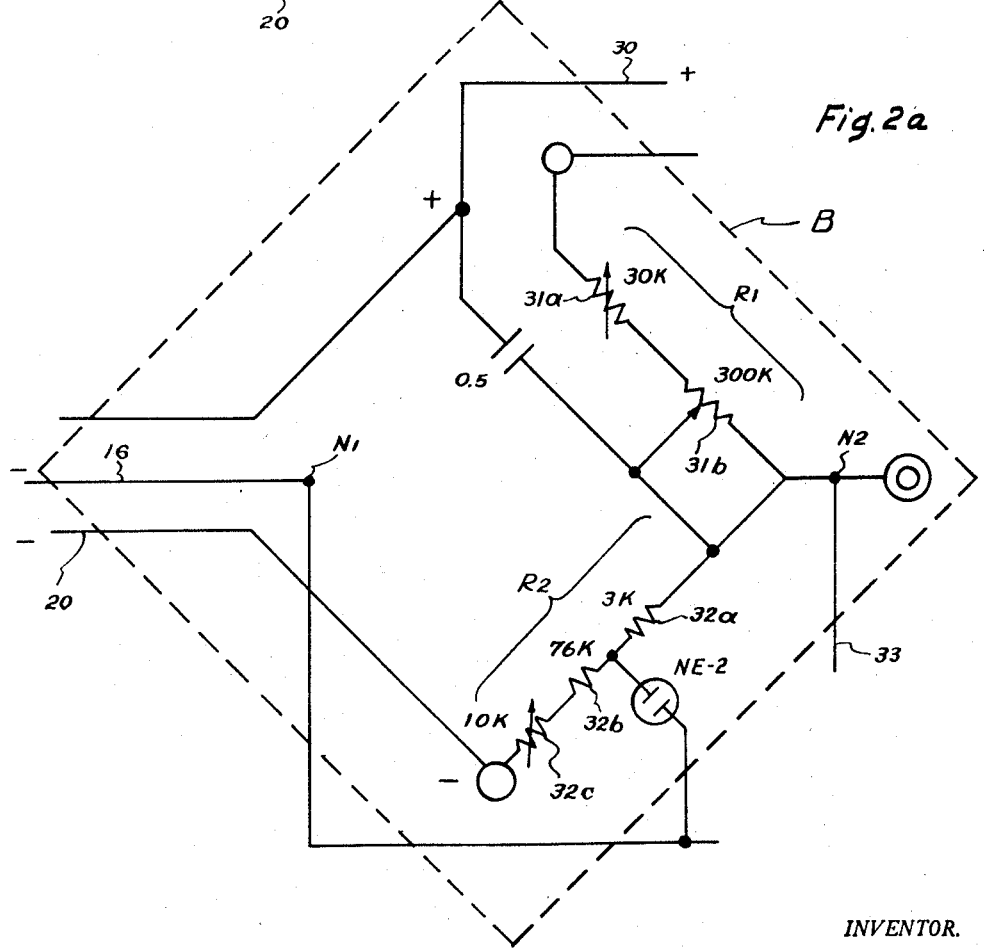
Figure 2:
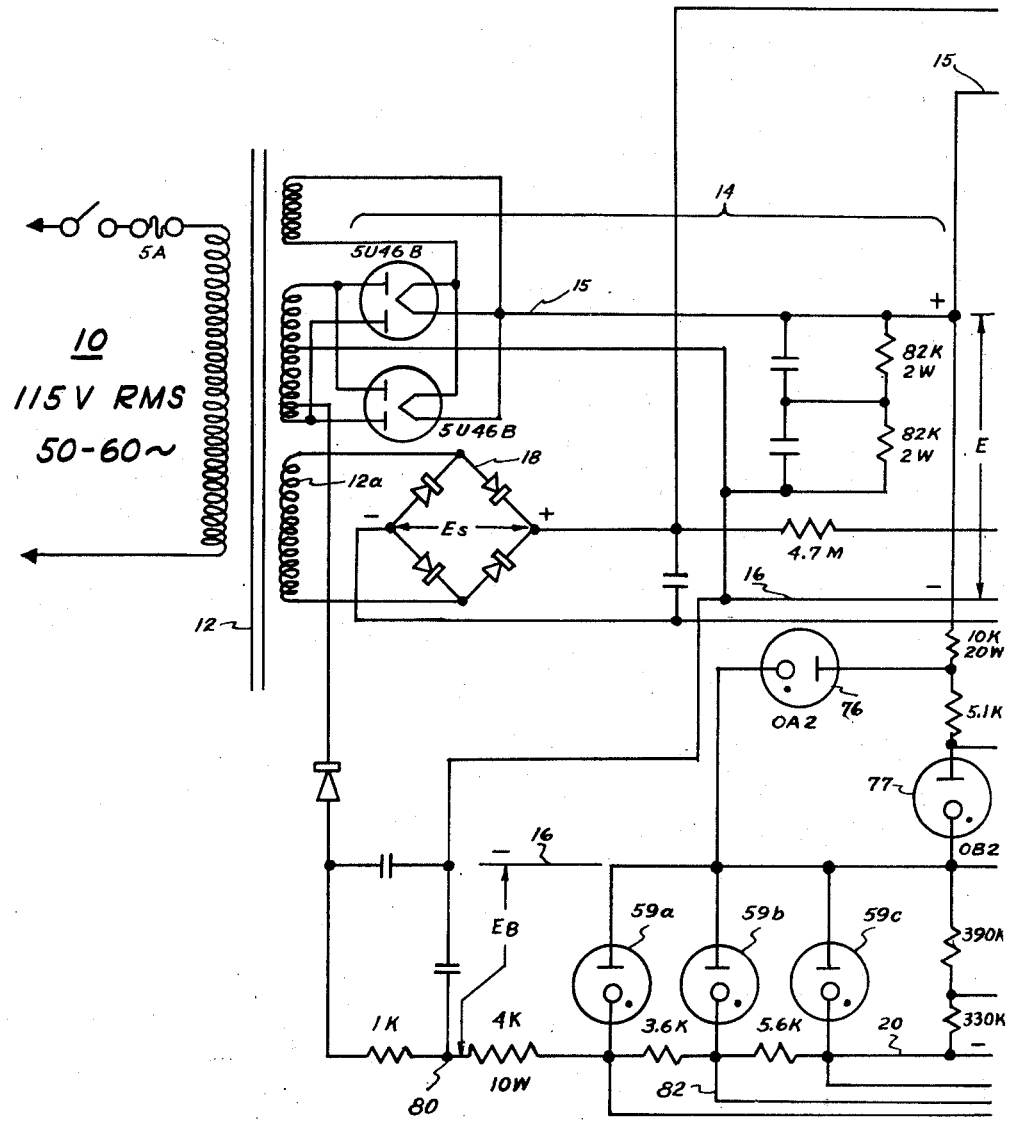
Figure 2:
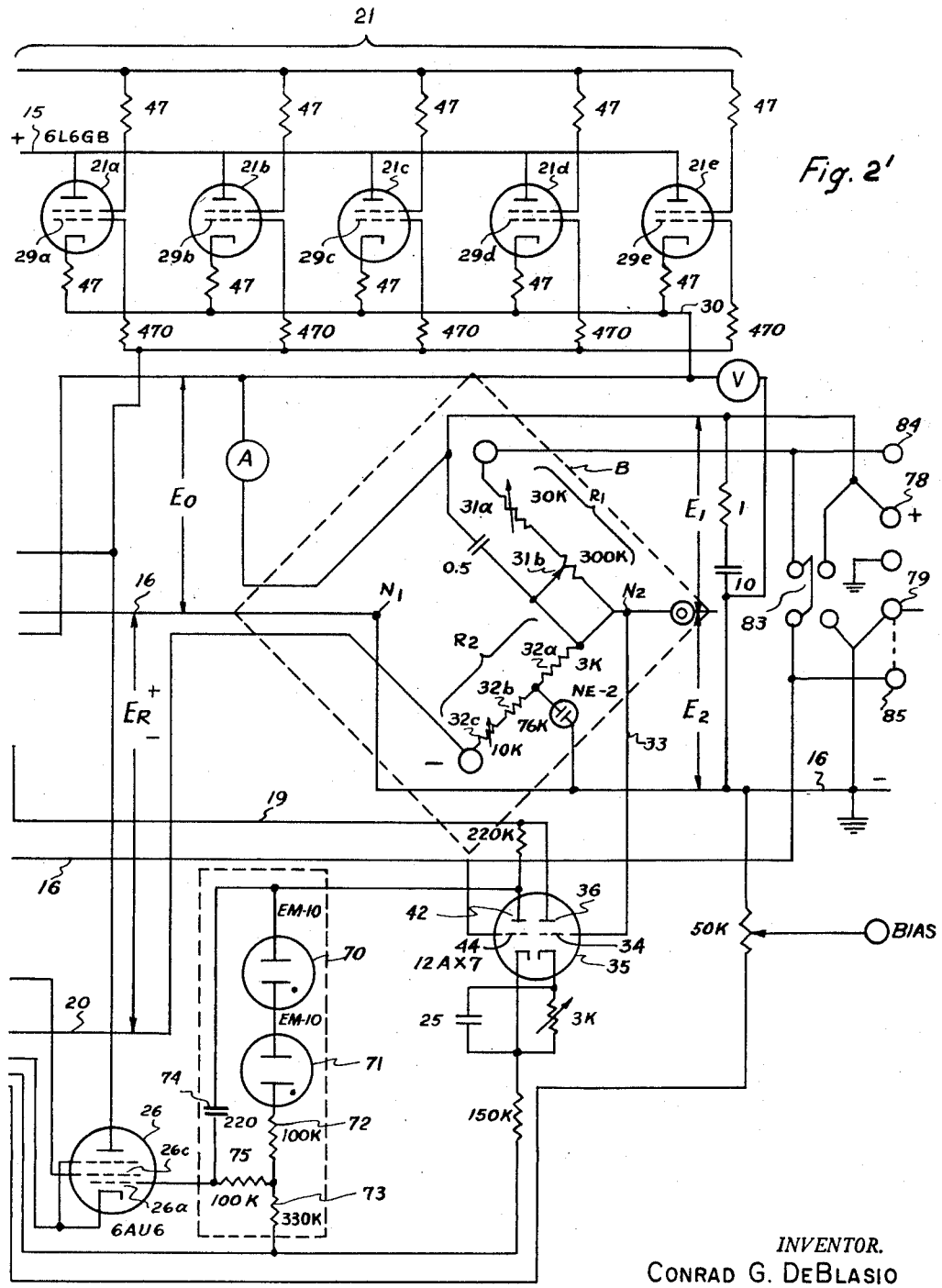

For the purpose of illustrating my invention an embodiment thereof is shown in the drawings, wherein Fig. 1 is a simplified schematic diagram of a D. C. power source of the prior art and of the general type or class to which my improved power source or system belongs;

Figs. 2 and 2', shown on, respectively, different sheets which, when fitted together or matched, constitute the entire simplified schematic diagram of a D. C. power source or system constructed and operating in accordance with my invention, such elements and parts of circuitry as will be obvious to those skilled in the art being omitted for the sake of simplification of disclosure of the novel features or arrangements claimed herein; and Fig. 2a is an enlarged, detail view taken from Fig. 2.

The system disclosed herein is comparable with the D. C. power source or system disclosed in my copending application filed March 21, 1955, and bearing Serial No. 495,619. For the purposes of comparison and wherever it is feasible, the various connections, circuitry, components and values which correspond to or are the equivalent of each of the latter in my copending application, are designated by the same, respective reference numerals or characters.

In Fig. 1, across lines 15 and 16 there is applied a source of power E, i. e., a suitable supply of variable, unregulated direct current which delivers current to the load 22 through a series element 21. A bus or line 20 is at a constant auxiliary potential, below the negative bus 16. A D. C. reference potential $Eb$ is impressed across lines 19 and 20. An input system or comparator 67, through a connection or tap 33 from resistor 32a, receives a part or portion of the potential, E1 plus E2, across a bleeder comprising resistors 31, 32a and 32. Thus, system 67 compares the potential E2 against the reference potential $Eb$. Should there occur any difference between these two potentials, such difference or "error" signal appears at 25, is amplified by an amplifier 26, and is then fed or applied to the grid 29 of control element 21 whose output line 30 is the positive line of the D. C. output $Eo$. The respective resistances of resistors 31, 32a, and 32 are such as to place input comparator 67 below the potential of the negative line or bus 16, as indicated. Accordingly, when $Eo$ is substantially zero or at least is approaching zero as a limit, input comparison can be said to be performed at a potential of minus E1 (below ground). On this basis, the total potential is minus ER. Thus, a fraction of the voltage between output line 30 and the bias line 20, is employed for input comparator 67.

Because of the above reasons, it has been conventionally accepted that low-voltage performance of the aforesaid prior art D. C. voltage sources or systems is very poor with regard to stability and regulation.

The various disadvantages of the prior art systems such as the one shown in Fig. 1, and which are not present in my improved system as shown in Figs. 2 and 2', are as follows:

(1) The relationship between the setting of the tap 33 and the output voltage $Eo$ is not a linear one. Furthermore, there is an offset voltage between the tap or point 33 and either of the output lines 30 and 16.

(2) The disposition of the input comparator system 67 is such as to magnify errors, particularly at low voltages.

(3) The control amplifier 26 determines the amount of error voltage necessary to drive the system. As the number of amplifier stages increases, the phase-shift problem is multiplied. Furthermore, there is a D. C. coupling loss from one stage to the next, inasmuch as the D. C. potential must be dropped at each step in order to avoid undue build-up.

(4) The series element 21 is generally a triode. Therefore, at voltages close to zero it may be presumed that the bias required on the grid 29 is equivalent to $$\frac{E}{u}$$

where E is the supply potential and $u$ represents the voltage gain factor of element 21. Since, as is well known, $u = gm\, r_p$ where $gm$ is transconductance and $r_p$ is plate resistance and since, furthermore, $r_p$ must be made very low to pass large currents, $u$ is generally of a low order in series elements. Therefore, a great deal of bias must be available at the output of amplifier 26. Alternatively, and as disclosed in my aforesaid copending application, a variable auto transformer may be provided so as to provide precise adjustment of E to the value dictated by the available bias in the system.

(5) For the control amplifier 26, a number of auxiliary potentials are required, especially where a multiplicity of stages is employed.

(6) It is relatively inconvenient to determine when the system is in proper balance since the potentials in the control system are considerably removed from either arm of the power system and further, because there is generally no simple measurement that will indicate a condition of relative balance.

With reference now to Fig. 2 and 2′, a main supply 10 of alternating current supplies a transformer 12 and its associated rectifier and filter system 14 across the output lines 15 and 16 of which there is produced the source E of high voltage D. C., variable and unregulated.

For the purpose of avoiding any necessity for close control of the input voltage E, an auxiliary potential $E_s$ is connected in positive sense between the cathodes and the respective screens 29a, 29b, 29c, 29d and 29e of series elements 21a, 21b, 21c, 21d and 21e. The auxiliary potential $E_s$ is derived from a separate winding 12a of transformer 12, and the associated rectifier 18. The auxiliary potential $E_s$ is therefore essentially independent of both the input (anode) voltage E and the output voltage Eo.

Between line 16 and point 80, there is the source EB of unregulated, high voltage D. C. for the reference and auxiliary control circuits hereinafter described.

The regulator or control vacuum tubes or elements 21a through 21e serve jointly as a variable impedance, series connected in the main high voltage, positive line 15, 30 and between the D. C. supply E and the load. The load (not shown) is connected across the output posts or terminals 78 and 79. The function of the tubes or series elements 21a through 21e is to permit or to provide for control of the output voltage Eo. The output voltage Eo is always equal to the difference between E and the voltage drop across the series elements or regulator tubes 21a through 21e.

As indicated by the dash-line rectangle B, it will be observed that my improved system embodies an electrical bridge configuration wherein the source of current E with the series regulator system 21, plus the reference potential ER, form one arm of the bridge and wherein resistances R1 and R2 form the other arm of the bridge. Resistance R1 comprises the series-connected vernier resistor 31a and the variable resistor 31b. Resistance R2 comprises the series-connected fixed resistors 32a and 32b and the variable, "calibration" resistor 32c.

A balanced detector 35 is connected as shown, to sense the null points N1 and N2 of the bridge configuration B.

It is desired that the input balanced detector 35 deliver error signals to a high gain amplifier system. At the same time, it is also desired that there be no gain loss in doing this and that the following system have as few stages as possible, for the reasons mentioned above. To this end, there is first provided a cascade regulator system, or chain providing potentials of stepped magnitudes and increasing orders of stability. The regulator vacuum tubes 59a, 59b and 59c form part of this chain. Tube 59c is the most highly stable of this chain, and provides the reference potential ER below the zero potential bus 16. An amplifier tube 26, having a grid 26a and a plurality of grids such as screen grid 26c, requires a negative potential for its cathode yet connection of a normal amplifier to any of the given potentials would upset the stability of the same due to variations in the current of amplifier 26. Accordingly, tube 26 is operated in the "starved" condition, i. e., with low screen voltage and exceedingly small plate current, thereby making possible connection, as shown, to the refernce element or tube 59c. The changes in plate current are so small as to impose negligible effect on the reference element 59c.

To make possible a low-loss connection between anode 42 and grid 26a, special neon regulators 70 and 71 are employed. These are kept burning through resistors 72 and 73. The intermediate potential line 82 provides a convenient point having somewhat greater negative potential than the potential on grid 26a. Capacitor 74 and resistor 75 form a de-coupling system for A. C. currents so elements 70 and 71 serve only to establish a quiescent or fixed bias between anode 42 and grid 26a. Alternating currents pass through capacitor 74 without appearing at the neon elements 70 and 71. Resistor 72 increases the decoupling and introduces a fixed, small amount of negative loss to overcome reverse regulating characteristics which might otherwise be introduced by elements 70 and 71.

Since the input detector or comparator tube 35 operates with sensing elements 34 and 44 at zero potential with respect to negative line 16, voltages are required for the associated anodes 36 and 42, the latter being above (positive) the negative bus 16. Accordingly, auxiliary regulator tubes 76 and 77 provide a highly stable potential for this purpose, driven by positive voltage E which is required for the series elements 21a through 21e.

Use of the auxiliary potential $E_s$ provides the two, following, distinct advantages:

(1) The auxiliary potentials $E_s$ being essentially independent of both the input (anode) voltage E and the output voltage Eo, the cut-off bias required for the elements is essentially $$E_c = \frac{E_B}{u_s}$$

In this case $u_s$ is the $u$ of the grid-screen circuit. Therefore, the bias required will not increase with an increase in supply potential E. Accordingly, the moderate bias provided at the cathode of amplifier 26 will be sufficient regardless of the condition of E. Since tube 26 is operated as a "starved" amplifier its anode can be brought very close to cathode potential under all conditions.

(2) The anode load for the "starved" amplifier 26 is returned, as shown, to the auxiliary potential $E_s$. Since the auxiliary potential $E_s$ is relatively constant with respect to the output cathodes of series elements 21a through 21e and since the grid bias for these elements is also referred to the cathodes, it follows that the current through the anode load of tube 26 is relatively constant with large changes in E or Eo. This further reduces current changes which might adversely effect the reference potential ER.

With regard to the input system, we may write that $$\frac{E1}{E2} = \frac{R1}{R2}$$

Thus, when the potential difference between N1 and N2 is zero, it is evident that for R1 equals 0, Eo equals 0, and so on, proportionately.

It is very important to note that if the system departs from perfect balance as the result of changes in the detector system, it is only necessary to apply metering means across points N1 and N2 and then to adjust for zero potential between these points. When this is done the system error is eliminated and the voltage Eo is then dependent only upon resistances R1 and R2 and the reference potential ER. Thus the system, in addition to possessing extremely high inherent stability, can be made to contribute zero error by simply performing a null-balance check periodically. High quality control resistors should be used. It must also be noted that a highly stable external reference can be used where the stability of a reference glow tube is not sufficient.

Another point to note is that the potential terminals 84 and 85 and current terminals 78 and 79, are separate. In this manner the two, following, important purposes are accomplished.

(1) With switch 83 open, a control resistor (R) may be inserted from terminal or post 79 to terminal or post 85 so as to determine the output voltage according to the above relationship. In this instance, of course, the negative terminal or post 79 and terminal or post 85 would, through the control resistor, be connected together as indicated in dash line. Thus, remote control is possible at any distance over a two-terminal line, such as an insulated coaxial line. The voltage at all times will be determined by $Eo=KR$ derived from the simple relationship above, and wherein R is the resistance in ohms of the aforesaid control resistor. Thus, the power system may be controlled or programmed according to commands from a central control or automatic system.

(2) The strapping between the minus terminal or post 79 and post 85 may be opened and a lead taken from post 85 to the negative side of the load so as to eliminate lead drop by providing remote sensing. Thus, the voltage error may be sensed at any point provided these leads are sufficiently extended.

The double-pole single-throw switch 83 is connected as shown, for switching from local to remote use in the manner described above.

In Figs. 2' and 2a capacitance is given in microfarads and resistance is given in ohms, K designating 1,000 and M designating 1,000,000. These values are not critical. Some tube types are also indicated.

Various modifications within the conception of those skilled in the art are possible without departing from the spirit of my invention or the scope of the claims.

I claim as my invention:

1. In a direct current power source of the character described, lines respectively positive and negative, a control element series-connected in said positive line, means for supplying and applying direct current input voltage across the respective input terminals of said lines, the potential at said negative line being permanently fixed equivalent to a ground, a third line, means for supplying and applying across said negative line and said third line a reference potential under the condition whereat the potential of said third line is always negative with respect to the potential of said negative line, a first resistance and a second resistance series-connected with respect to each other and constituting jointly a constant-current divider connected across said third line and the output terminal of said positive line, said power source embodying an electrical bridge configuration wherein said input voltage with said control element and with said reference potential forms one arm of said bridge and wherein said first and second resistances form the other arm of said bridge, an input balanced detector tube constituting a comparator and having grid and plate circuits, said grid circuit being connected to said constant-current divider accordingly to be responsive to occurring variations in output voltage across the respective output terminals of said positive line and said negative line, an amplifier tube having grid and plate and screen circuits, means connecting the plate circuit of said detector tube to the grid circuit of said amplifier tube thereby to render said amplifier tube responsive to signals from said detector tube, means connecting said amplifier tube to operate with relatively low screen voltage and very small plate current thus to permit only small changes in the plate current of said amplifier tube during operation of said power source, and means electrically connecting said amplifier tube and said control element.

2. In a direct current power source of the character described, lines respectively positive and negative, a control element series-connected in said positive line, means for supplying and applying direct current input voltage across the respective input terminals of said lines, the potential at said negative line being permanently fixed equivalent to a ground, a third line, means for supplying and applying across said negative line and said third line a reference potential under the condition whereat the potential of said third line is always negative with respect to the potential of said negative line, a first resistance and a second resistance series-connected with respect to each other and constituting jointly a constant-current divider connected across said third line and the output terminal of said positive line, said power source embodying an electrical bridge configuration wherein said input voltage with said control element and with said reference potential forms one arm of said bridge and wherein said first and second resistances form the other arm of said bridge, an input balanced detector tube constituting a comparator and having grid and plate circuits, said grid circuit being connected to said constant-current divider accordingly to be responsive to occurring variations in output voltage across the respective output terminals of said positive line and said negative line, an amplifier tube having grid and plate circuits, and means connecting the plate circuit of said detector tube to the grid circuit of said amplifier tube thereby to render said amplifier tube responsive to signals from said detector tube, neon regulator tubes series-connected with respect to each other and connected between the plate circuit of said detector tube and the grid circuit of said amplifier tube and establishing a quiescent bias between the plate circuit of said detector tube and the grid circuit of said amplifier tube, and means electrically connecting said amplifier tube and said control element.

3. In a direct current power source of the character described, lines respectively positive and negative, a control element series-connected in said positive line, means for supplying and applying direct current input voltage across the respective input terminals of said lines, the potential at said negative line being permanently fixed equivalent to a ground, a third line, means for supplying and applying across said negative line and said third line a reference potential under the conditions whereat the potential of said third line is always negative with respect to the potential of said negative line, a first resistance and a second resistance series-connected with respect to each other and constituting jointly a constant-current divider connected across said third line and the output terminal of said positive line, said power source embodying an electrical bridge configuration wherein said input voltage with said control element and with said reference potential forms one arm of said bridge and wherein said first and second resistances form the other arm of said bridge, a balanced detector tube constituting a comparator and provided with a plate circuit and having a first grid connected to said constant-current divider accordingly to be responsive to occurring variations in output voltage across the respective output terminals of said positive line and said negative line, said detector tube having a second grid connected to said negative line, an amplifier tube having grid and plate circuits, means connecting the plate circuit of said detector tube to the grid circuit of said amplifier tube thereby to render said amplifier tube responsive to signals from said detector tube, said connecting means including neon regulator tubes series-connected with respect to each other and connected between the plate circuit of said detector tube and the grid circuit of said amplifier tube and establishing a quiescent bias between the plate circuit of said detector tube and the grid circuit of said means electrically connecting said amplifier and said control element, and means electrically connected between said detector tube and said amplifier and functional to correlate operating action of said detector tube and said control element in such wise that during normal operation of said power source each of said grids of said detector tube is at a potential substantially zero with respect to the potential of said negative line.

4. In a direct current power source of the character described, lines respectively positive and negative, a control element series-connected in said positive line, means for supplying and applying direct current input voltage across the respective input terminals of said lines, the potential at said negative line being permanently fixed equivalent to a ground, a third line, means for supplying and applying across said negative line and said third line a reference potential under the conditions whereat the potential of said third line is always negative with respect to the potential of said negative line, a first resistance and a second resistance series-connected with respect to each other and constituting jointly a constant-current divider connected across said third line and the output terminal of said positive line, said power source embodying an electrical bridge configuration wherein said input voltage with said control element and with said reference potential forms one arm of said bridge and wherein said first and second resistances form the other arm of said bridge, an input balanced detector tube constituting a comparator and having grid and plate circuits, said grid circuit being connected to said constant-current divider accordingly to be responsive to occurring variations in output voltage across the respective output terminals of said positive line and said negative line, an amplifier tube having grid and plate circuits, means connecting the plate circuit of said detector tube to the grid circuit of said amplifier tube thereby to render said amplifier tube responsive to signals from said detector tube, auxiliary regulator tubes supplied from and driven by the input voltage at the input terminal of said positive line and connected to supply the plate circuit of said detector tube with voltages positive with respect to said negative line, and means electrically connecting said amplifier tube and said control element.

5. In a direct current power source of the character described, lines respectively positive and negative, a control element having a cathode and a plurality of screens and being series-connected in said positive line, means for supplying and applying direct current input voltage across the respective input terminals of said lines, the potential at said negative line being permanently fixed equivalent to a ground, a third line, means for supplying and applying across said negative line and said third line a reference potential under the conditions whereat the potential of said third line is always negative with respect to the potential of said negative line, a first resistance and a second resistance series-connected with respect to each other and constituting jointly a constant-current divider connected across said third line and the output terminal of said positive line, said power source embodying an electrical bridge configuration wherein said input voltage with said control element and with said reference potential forms one arm of said bridge and wherein said first and second resistances form the other arm of said bridge, an input balanced detector tube constituting a comparator and having grid and plate circuits, said grid circuit being connected to said constant-current divider accordingly to be responsive to occurring variations in output voltage across the respective output terminals of said positive line and said negative line, an amplifier tube having grid and plate circuits, means connecting the plate circuit of said detector tube to the grid circuit of said amplifier tube thereby to render said amplifier tube responsive to signals from said detector tube, a source of auxiliary potential independent of said input and output voltages and connected in positive sense with respect to said input voltage and between the cathode and a screen of said control element, and means electrically connecting said amplifier tube and said control element.

6. In a direct current power source of the character described, lines respectively positive and negative, a control element having a cathode and a plurality of screens and being series-connected in said positive line, means for supplying and applying direct current input voltage across the respective input terminals of said lines, the potential at said negative line being permanently fixed equivalent to a ground, a third line, means for supplying and applying across said negative line and said third line a reference potential under the conditions whereat the potential of said third line is always negative with respect to the potential of said negative line, a first resistance and a second resistance series-connected with respect to each other and constituting jointly a constant-current divider connected across said third line and the output terminal of said positive line, said power source embodying an electrical bridge configuration wherein said input voltage with said control element and with said reference potential forms one arm of said bridge and wherein said first and second resistances form the other arm of said bridge, an input balanced detector tube constituting a comparator and having grid and plate circuits, said grid circuit being connected to said constant-current divider accordingly to be responsive to occurring variations in output voltage across the respective output terminals of said positive line and said negative line, an amplifier tube having grid and plate circuits, means connecting the plate circuit of said detector tube to the grid circuit of said amplifier tube thereby to render said amplifier tube responsive to signals from said detector tube, a source of auxiliary potential independent of said input and output voltages and connected in positive sense with respect to said input voltage and between the cathode and a screen of said control element, connection means providing for return to said auxiliary potential of anode load for said amplifier tube, and means electrically connecting said amplifier tube and said control element.

7. In a direct current power source of the character described, lines respectively positive and negative, potential terminals for said lines positive and negative respectively, current terminals for said lines positive and negative respectively and separate from said potential terminals, a control element series-connected in said positive line, means for supplying and applying direct current input voltage across the respective input terminals of said lines, the potential at said negative line being permanently fixed equivalent to a ground, a third line, means for supplying and applying across said negative line and said third line a reference potential under the condition whereat the potential of said third line is always negative with respect to the potential of said negative line, a first resistance and a second resistance series-connected with respect to each other and constituting jointly a constant-current divider connected across said third line and the output terminal of said positive line, said power source embodying an electrical bridge configuration wherein said input voltage with said control element and with said reference potential forms one arm of said bridge and wherein said first and second resistances form the other arm of said bridge, an input balanced detector tube constituting a comparator and having grid and plate circuits, said grid circuit being connected to said constant-current divider accordingly to be responsive to occurring variations in output voltage across the respective output terminals of said positive line and said negative line, an amplifier tube having grid and plate circuits, means connecting the plate circuit of said detector tube to the grid circuit of said amplifier tube thereby to render said amplifier tube responsive to signals from said detector tube, means electrically connecting said amplifier tube and said control element, a control resistor connected between said negative potential terminal and said negative current terminal thus to determine the output voltage of said source, and switch means connected across said last-named terminals and movable either to an open position to render said resistor effective or to a closed position to render said resistor non-effective.

8. In a direct current source of the character described, lines respectively positive and negative, a control element series-connected in said positive line, means for supplying and applying direct current input voltage across the respective input terminals of said lines, the potential at said negative line being permanently fixed equivalent to a ground, a third line, means for supplying and applying across said negative line and said third line a reference potential under the condition whereat the potential of said third line is always negative with respect to the potential of said negative line, a first resistance and a second resistance series-connected with respect to each other and constituting jointly a constant-current divider connected across said third line and the output terminal of said positive line, said power source embodying an electrical bridge configuration wherein said input voltage with said control element, and with said reference potential forms one arm of said bridge and wherein said first and second resistances form the other arm of said bridge, an input balanced detector tube constituting a comparator and having grid and plate circuits, said grid circuit being connected to said constant-current divider accordingly to be responsive to occurring variations in output voltage across the respective output terminals of said positive line and said negative line, an amplifier tube having grid and plate circuits, means connecting the plate circuit of said detector tube to the grid circuit of said amplifier tube thereby to render said amplifier tube responsive to signals from said detector tube, and means electrically connecting said amplifier tube and said control element.

9. In a direct current power source of the character described, lines respectively positive and negative, a control element series connected in said positive line, means for supplying and applying direct current input voltage across the respective input terminals of said lines, the potential at said negative line being permanently fixed equivalent to a ground, a third line, means for supplying and applying across said negative line and said third line a reference potential under the condition whereat the potential of said third line is always negative with respect to the potential of said negative line, a first resistance and a second resistance series-connected with respect to each other and constituting jointly a constant-current divider connected across said third line and the output terminal of said positive line, said power source embodying an electrical bridge configuration wherein said input voltage with said control element and with said reference potential forms one arm of said bridge and wherein said first and second resistances form the other arm of said bridge, an input balanced detector tube constituting a comparator and having grid and plate circuits, said grid circuit being connected to said constant-current divider accordingly to be responsive to occurring variations in output voltage across the respective output terminals of said positive line and said negative line, an amplifier tube having grid and plate circuits, means connecting the plate circuits of said detector tube to the grid circuit of said amplifier tube thereby to render said amplifier tube responsive to signals from said detector tube, said second-named means for supplying said reference potential comprising a plurality of current-regulator tubes connected with respect to each other to constitute a cascade regulator chain providing potentials of stepped magnitudes, the last tube in said chain providing said reference potential below and negative with respect to the potential of said negative line, and means electrically connecting said amplifier tube and said control element.

10. In a direct current source of the character described, lines respecively positive and negative, a control element series-connected in said positive line, means for supplying and applying direct current input voltage across the respective input terminals of said lines, the potential at said negative line being permanently fixed equivalent to a ground, a third line, means for supplying and applying across said negative line and said third line a reference potential under the condition whereat the potential of said third line is always negative with respect to the potential of said negative line, a first resistance and a second resistance series-connected with respect to each other and constituting jointly a constant-current divider connected across said third line and the ouput terminal of said positive line, said power source embodying an electrical bridge configuration wherein said input voltage with said control element and with said reference potential forms one arm of said bridge and wherein said first and second resistances form the other arm of said bridge, a balanced detector tube constituting a comparator and having a first grid connected to said constant-current divider and a second grid connected to said negative line, an amplifier responsive to control signals from said detector tube, means electrically connecting said amplifier and said control element, and means electrically connected between said detector tube and said amplifier and functional to correlate operating action of said detector tube and said control element in such wise that during normal operation of said power source each of said grids of said detector tube is at a potential substantially zero with respect to the potential of said negative line.

11. In a direct current source of the character described, lines respectively positive and negative, potential terminals for said lines positive and negative respectively, current terminals for said lines positive and negative respectively and separate from said potential terminals, a control element series-connected in said positive line, means for supplying and applying direct current input voltage across the respective input terminals of said lines, the potential at said negative line being permanently fixed equivalent to a ground, a third line, means for supplying and applying across said negative line and said third line a reference potential under the condition whereat the potential of said third line is always negative with respect to the potential of said negative line, a first resistance and a second resistance series-connected with respect to each other and constituting jointly a constant-current divider connected across said third line and the output terminal of said positive line, said power source embodying an electrical bridge configuration wherein said input voltage with said control element and with said reference potential forms one arm of said bridge and wherein said first and second resistances form the other arm of said bridge, a balanced detector tube constituting a comparator and having a first grid connected to said constant-current divider and a second grid connected to said negative line, an amplifier responsive to control signals from said detector tube, means electrically connecting said amplifier and said control element, means electrically connected between said detector tube and said amplifier and functional to correlate operating action of said detector tube and said control element in such wise that during normal operation of said power source each of said grids is at a potential substantially zero with respect to the potential of said negative line, a control resistor connected between said negative potential terminal and said negative current terminal thus to determine the output voltage of said source, and switch means connected across said last-mentioned terminals and movable either to an open position to render said resistor effective or to a closed position to render said resistor non-effective.

References Cited in the file of this patent

UNITED STATES PATENTS 2,556,129    Wellons    June 5, 1951
2,780,734    Gamble    Feb. 5, 1957